United States Patent [19]

Yu

[11] 4,155,325
[45] May 22, 1979

[54] LOW TIRE PRESSURE WARNING INDICATOR

[76] Inventor: Kuei Chin Yu, 3 La. 45 Chad Yang St., Sanchung City, Taipei, Taiwan

[21] Appl. No.: 869,188

[22] Filed: Jan. 13, 1978

[51] Int. Cl.² ............................................. B60C 23/04
[52] U.S. Cl. ............................ 116/34 R; 116/DIG. 8
[58] Field of Search ..................... 116/34 R, DIG. 8; 73/146.8; 137/227, 557

[56] References Cited

U.S. PATENT DOCUMENTS

| | | | |
|---|---|---|---|
| 1,236,411 | 8/1917 | Downs | 116/34 R |
| 1,671,852 | 5/1928 | Caldwell | 116/34 R |
| 4,024,829 | 5/1977 | Su | 116/34 R |

*Primary Examiner*—S. Clement Swisher
*Assistant Examiner*—Denis E. Corr
*Attorney, Agent, or Firm*—Reising, Ethington, Barnard, Perry & Brooks

[57] ABSTRACT

A warning indicator disclosed is secured to a pneumatic tire valve to sense tire pressure and emit an audible signal when the tire pressure goes below a predetermined value. A connector of the indicator is initially threaded onto the tire valve and a cap thereof is subsequently threaded onto the connector. The connector includes a valve opener that opens the tire valve so that pressurized tire air flows to a pressure sensing valve which prevents air flow to the cap when normal tire pressures are sensed. A valve element of the pressure sensing valve moves into and out of engagement with a valve seat and is engaged by the first end of a valve actuator that also has a second end projecting toward the cap. The cap includes a housing with a spring that biases an actuating member into engagement with the second end of the actuator so as to move the valve element out of engagement with the valve seat when low tire air pressure is present. The second end of the actuator has a rounded shape engaged by the actuating member with substantially point contact so as to generate a minimum of frictional force tending to rotate the actuator and move the valve element as the cap is screwed onto the connector. Air flow to the cap blows up an elastomeric cover thereof which ultimately ruptures to provide an audible bang indicating low tire pressure. Subsequently, a ball of a closure valve in the cap seats against a round valve seat to prevent continued air flow from the tire to the atmosphere through the indicator.

10 Claims, 2 Drawing Figures

LOW TIRE PRESSURE WARNING INDICATOR

BACKGROUND OF THE INVENTION

1. Field of the Invention

This invention relates to a warning indicator that senses tire pressure and emits an audible alarm when a low tire air pressure is sensed.

2. Description of the Prior Art

U.S. Pat. Nos. 1,455,146; 3,929,090; and 4,024,829 disclose tire pressure warning devices that sense tire air pressure and, upon sensing a low tire pressure condition, blow up an elastomeric member that pops to provide an audible sound indicating such condition. In the first two listed patents above and all but one embodiment of the last patent, the devices each include a valve mechanism that works against the normal tire valve through which air is supplied and exhausted into and out of the tire. When tire pressures are within the normal range, the tire valve has its valve element biased outwardly with a sufficient force to resist a bias of the valve mechanism tending to move the tire valve element inwardly to open the tire valve. However, when low tire pressure conditions are present, the tire pressure valve element bias in the outward direction is not great enough to counteract the inward bias of the valve mechanism and the tire valve is then opened to allow pressurized tire air to flow outwardly and blow up the elastomeric member in order to cause it to rupture and pop. With this type of warning device, it is difficult to achieve uniform pressure sensing due to manufacturing variances of the tire valves with which the device is used. Different tire valves of the same design and construction may require different forces to open their valve elements and thereby permit the air flow that blows up the elastomeric member which ruptures to provide the audible alarm indicating a low tire pressure condition.

One embodiment of the U.S. Pat. No. 4,024,829 includes a valve opener that opens the tire valve element as the warning device is secured to the tire valve. Pressurized tire air which flows to the warning device must pass a pressure sensing valve before passage to a chamber enclosed by the elastomeric member which ruptures. A spring biased valve actuator biases a valve element of the pressure sensing valve and acts against the pressurized air from the tire to sense its pressure and unseat the valve element when a low pressure condition is sensed. It has been found that problems can occur if this warning device is not made with a two-piece construction since the spring biased valve actuator can maintain the valve element of the pressure sensing valve open as the warning device is attached to the tire valve. A connector subassembly can be initially secured to the tire valve prior to securing the indicator to the subassembly. However, as the warning device is secured to the connector subassembly, the spring biased actuator can engage the valve element of the pressure sensing valve and move it so that air flows past the pressure sensing valve to blow up the elastomeric member even though the tire air pressure is not low. If a threaded connection is used to secure the warning device to the connector subassembly, friction generated between the spring biased valve actuator of the warning device can tend to rotate the pressure sensing valve element and thereby cause leakage which likewise blows up the elastomeric member.

Other tire pressure sensing devices are disclosed by U.S. Pat. Nos. 1,236,411; 1,450,769; 2,037,969; 2,795,204; 3,276,417; 3,111,930; 3,489,167; 3,536,026; 3,572,283; 3,680,523; 3,738,308; 3,776,174; and 3,827,393.

SUMMARY OF THE INVENTION

An object of the present invention is to provide an improved low tire pressure warning indicator including a connector that is initially secured to a tire valve for use and a cap that is subsequently secured to the connector to cooperate therewith in accurately sensing tire air pressure and providing an audible alarm only when this air pressure drops below a predetermined value.

In carrying out the above object, the warning indicator includes a pressure sensing valve on the connector controlled by the level of tire air pressure and the cooperable action of a valve actuator on the connector and a spring biased actuating member of the cap. First and second ends of the valve actuator on the connector respectively engage a valve element of the pressure sensing valve and the actuating member of the cap. As the connector is initially secured to the tire valve, a valve opener opens the tire valve to allow pressurized tire air to flow to a passage of the connector and move the pressure sensing valve element against its valve seat. The valve actuator slides with a clearance fit in a guide portion of the passage and is moved outwardly away from the tire valve as this valve element is seated. An end of the spring biased actuating member on the cap engages the second end of the valve actuator as the cap is secured to the connector by a threaded connection. One of the interengaged ends on the valve actuator and the spring biased actuating member is rounded to minimize rotational friction applied to the valve actuator as the cap is threaded onto the connector. Any tendency of the valve actuator to rotate the valve element is thereby lessened in order to prevent movement of the pressure sensing valve element and any tendency of air to pass through the pressure sensing valve unless the tire air is not of a sufficient pressure to counteract the spring biased actuating member. When the tire air is below such a pressure, the valve element is unseated and air flows to the cap within an elastomeric cover that is blown up and ultimately ruptured to provide the alarm that indicates a low tire pressure condition. A closure valve in the cap closes after the cover ruptures to prevent continued flow of tire air from the cap to the atmosphere.

The valve actuator of the connector preferably has its first end which engages the valve element enlarged and its second end provided with the rounded shape that engages the end of the spring biased actuating member on the cap. A depression in a housing of the connector receives the enlarged first end of the actuator as the valve element of the pressure sensing valve is seated. Rubber and metal discs of the valve element are secured to each other with the rubber disc engaged by the enlarged end of the valve actuator and also movable into and out of engagement with the valve seat. The steel disc provides reinforcement to the rubber disc and is located closer to the tire valve than the cap. A metal housing portion and a plastic housing portion of the connector are threaded to each other to cooperatively define the passage through which air from the tire flows to the cap past the pressure sensing valve when a low pressure tire condition is sensed.

The closure valve of the cap is located within a housing thereof and includes a bore having an outer end with a restricted valve seat. A valve element of the closure valve is initially received within an inner end of the bore which has a larger size than the outer bore end. The shape of the valve bore is such that air can flow around the valve element when located within the inner bore end to blow up the elastomeric cover. Once the cover ruptures, air flow from the tire is of a sufficient magnitude to move the valve element outwardly into the outer bore end with an interference fit condition and into engagement with the restricted valve seat where it is retained so as to terminate the air flow to the atmosphere.

Preferably, the closure valve bore has flat sides along the length thereof and the valve element therein is a deformable plastic or rubber ball whose diameter is larger enough so as to provide the interference fit condition that deforms the ball as it is moved to the outer end of the bore. Air can flow through the bore at spaced junctures between the flat sides thereof until the outward ball movement seats it against the restricted valve seat which has a round shape at the outer end of the bore.

The cap housing includes a main housing portion in which the actuating member and the spring thereof are received and a closure valve housing portion in which the closure valve is located. These two housing portions are threaded to each other during assembly to compress the spring of the actuating member. A metal ring secures the elastomeric cover to the cap housing at an inner extremity thereof adjacent the connector.

The objects, features, and advantages of the present invention are readily apparent from the following detailed description of the preferred embodiment taken in connection with the accompanying drawings.

DETAILED DESCRIPTION OF THE PREFERRED EMBODIMENT

Figure 1:
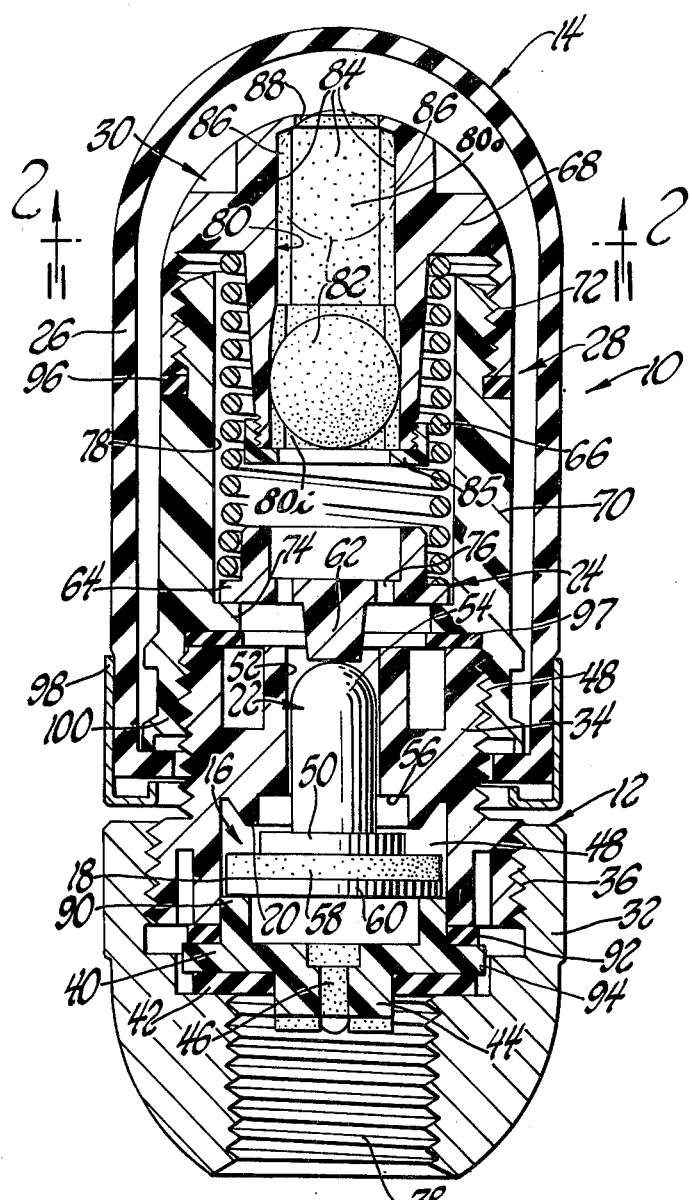
FIG. 1 is a sectional view through a low tire pressure warning indicator that is constructed according to the present invention.

Referring to FIG. 1, a warning indicator constructed according to the present invention and indicated generally by reference numeral 10 is used with a pneumatic tire and provides an audible alarm when a low tire air pressure condition is sensed. Indicator 10 includes a connector 12 that is initially secured to the tire fill valve and a cap 14 that is subsequently secured to the connector. A pressure sensing valve 16 of connector 12 senses the tire air pressure to normally prevent air flow through the connector to the cap 14 except when a low tire pressure condition is present. Valve 16 includes a valve element 18 and a valve seat 20 against which the valve element is seated to close the valve. A valve actuator 22 of the connector 12 and a spring biased actuating member 24 of the cap 14 open the valve 16 to allow air flow therethrough to the cap when low tire air pressure is present. Air that flows from the connector 12 to the cap then blows up an elastomeric cover 26 in which the cap housing 28 is enclosed. Cover 26 ultimately ruptures and provides an explosive sound or alarm that warns the vehicle driver of the low tire pressure condition. Cap 14 also includes a closure valve 30 which closes after the cover 26 ruptures to prevent continued air flow from the tire to the atmosphere.

Connector 12 includes a housing having a metal housing portion 32 and a plastic housing portion 34 that are secured to each other by a threaded connection 36 during assembly. Metal housing portion 32 includes a threaded bore 38 that receives the tire fill valve. A valve opener 40 is sealed with the metal housing portion 32 by a resilient washer 42 at the upper end of bore 38 and includes a central projection 44 that extends downwardly to open the tire fill valve as the connector is threaded onto the tire valve. A central hole 46 through valve opener 40 feeds the pressurized tire air upwardly through a passage 48 that is cooperatively provided in the connector by its metal and plastic housing portions 32 and 34. It should be remembered that the connector is secured to the tire fill valve before the cap 14 is secured to the connector at a threaded connection 48 so that the air initially fed into the passage 48 is free to move the valve element 18 toward the valve seat 20. A first enlarged end 50 of the valve actuator 22 has a flat shape and engages the valve element 18 so as to be moved outwardly within a guide portion 52 of the connector passage 48. A second rounded end 54 of the actuator then projects outwardly from the connector plastic housing portion 34 while the first end is received within a housing depression 56 within the valve seat 20. Valve element 18 includes a rubber disc 58 that engages the valve seat 20 and a metal disc 60 that is secured to the rubber disc on the side thereof adjacent the valve opener 44.

After the connector 12 is secured to the tire fill valve as described above, the cap 14 is then threaded onto the connector at the connection 48 so that a downwardly projecting end 62 of the actuating member 24 engages the rounded end 54 of the valve actuator 22. A flange 64 of the actuating member 24 seats one end of a helical spring 66 whose other end is seated by a plastic closure valve housing portion 68 of the cap housing 28. A plastic main housing portion 70 of the cap housing 28 is threaded to the closure valve housing portion 68 at a connection 72 to compress the spring 66 with the flange 64 seated against an inner annular flange 74 of the main housing portion.

As the cap 14 is threaded onto the connector 12 at the connection 48 between the connector housing portion 34 and the main cap housing portion 70, only point contact exists between the actuating member end 62 and the rounded end 54 of the valve actuator 22. A minimum of frictional force tending to rotate the valve actuator 22 is thus present so as to minimize the tendency of the actuator to rotate the valve element 18. Such rotation could cause air leakage through the connector passage guide portion 52 to the cap and consequent blowing up of the cover 26 and rupturing thereof even though a low tire air pressure condition is not present. Also, even though there is a clearance between the passage guide portion 52 and the actuator 22 sufficient to let air flow from the connector 12 to the cap 14, the guide portion guides the actuator in a slidably supported manner inwardly and outwardly so that no skewed forces are applied thereto by the spring biased actuating member 24. Such skewed forces could act through the actuator 22 against the valve element 18 and thereby unseat the valve element even though a low tire air pressure condition is not present. Blowing up of the cap cover 26 and rupturing thereof even though low tire pressure conditions are not present is thus prevented.

When a low tire pressure condition is present, the bias of spring 66 acting on actuating member 24 is greater than the air pressure biasing the valve element 18 against the seat 20. Actuating member 24 then moves the actuator 22 toward the tire valve bore 38 and thereby unseats the valve element 18 so that air can flow upwardly through the opener hole 46 around the valve element 18 within the passage 48 and upwardly through the passage guide portion 52 around the actuator 22. As the pressurized tire air flows into the cap 14, holes 76 in the actuating member 24 feed this air through a central cavity 78 of the cap housing portion 70 in which the spring 66 is received. Closure valve 30 is then opened, as will be more fully hereinafter described, and feeds the pressurized tire air outwardly from the cap housing 28 into the elastomeric cover 26 which is then blown up. Ultimately, cover 26 ruptures and provides a loud explosive alarm that indicates the low tire pressure condition. Valve 30 then closes to terminate the flow of tire air to the atmosphere.

Figure 2:
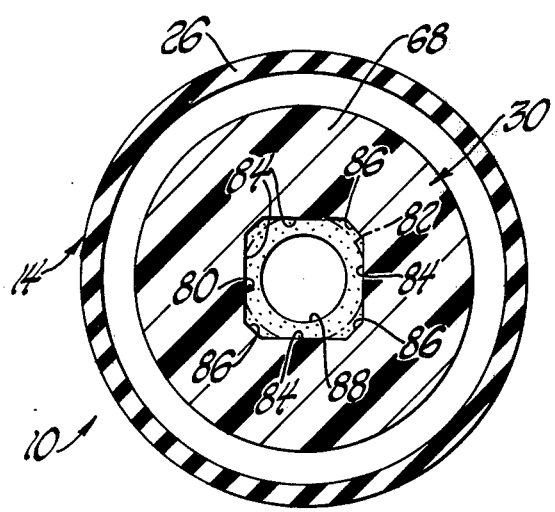
FIG. 2 is a sectional view of the indicator taken along line 2—2 of FIG. 1.

As seen by combined reference to FIGS. 1 and 2, a bore 80 of closure valve 30 is defined within the housing portion 68. Bore 80 has an inner end 80i and an outer end 80o of a larger size than its inner end. A valve element 82 of this valve in the form of a round deformable plastic or rubber ball is initially received within the inner bore end 80i. Bore 80 includes flat sides 84 that are joined at junctures 86. Valve element ball 82 has the same or a slightly larger diameter than the spacing between the bore sides 84 at the inner bore end and is retained therein by a flanged annular ring 85 threaded on the housing 68. Ball 82 has a larger diameter than the spacing between walls 84 at the outer bore end 80o and is deformed upon movement thereinto in an interference fit condition. When the ball 82 is in the inner bore end, pressurized air from the tire can flow between the ball 82 and the bore side junctures 86 outwardly through a restricted valve seat 88 of a round shape at the outer end of the bore. When the cover 26 ruptures, the air flow through the closure valve 30 acts on the ball 82 with a sufficient magnitude to force it outwardly against the valve seat 88 and thereby closes the valve and terminates the flow of pressurized tire air to the environment. The interference fit between ball 82 and the sides 84 at the outer bore end retains the ball engaged with the seat.

As the connector metal housing portion 32 and plastic housing portion 34 are threaded to each other, an annular ridge 90 of the tire fill valve opener 40 is received within the lower end of the plastic housing portion and a resilient washer 92 seals between the plastic housing portion and an annular flange 94 of the tire valve opener. Likewise, a resilient washer 96 seals between the cap housing portions 68 and 70 as they are secured to each other at their threaded connection 72, and a resilient washer 97 seals between the connector and cap housing as the cap 14 is threaded onto the connector 12. A metal ring 98 seals the lower end of the elastomeric cover 26 with a lower end 100 of the cap housing portion 70 as the cap 14 is threaded downwardly onto the connector 20.

While the exact construction of the indicator which has herein been described is preferred, those skilled in this art will recognize various alternative constructions and variations for practicing the present invention which is defined by the following claims.

What is claimed is:

1. A tire pressure warning indicator comprising: a connector that is secured to a tire valve for use; a cap that is secured to the connector after securement of the connector to the tire valve; the connector including a housing having a tire valve opener that opens the tire valve upon securement of the connector thereto; the housing also having a passage for communicating the pressurized air from the tire valve to the cap; a pressure sensing valve disposed along the passage and having a valve seat and a valve element movable into and out of engagement with the valve seat to control the flow of pressurized air to the cap from the tire valve; the valve element being engaged with the seat by pressurized air from the tire valve at normal tire pressures; a valve actuator mounted by the connector housing for movement toward and away from the tire valve; the valve actuator having a first end that engages the valve element of the pressure sensing valve and a second end that extends toward the cap; the cap including a housing that is secured to the housing of the connector upon the cap securement to the connector; an actuating member mounted within the cap housing; a spring that biases the actuating member into engagement with the second end of the valve actuator of the connector; said spring having a bias that unseats the valve element from the seat through the actuating member and the actuator when the air from the tire valve drops below a predetermined normal tire pressure; an elastomeric cover in which the housing of the cap is enclosed; said elastomeric cover being blown up by air which flows thereinto from the pressure sensing valve when the valve element thereof is unseated and the blown up cover ultimately rupturing to provide an alarm that indicates a low tire pressure condition; and a valve in the cap that closes after the cover ruptures to prevent continued flow of tire air from the cap housing to the atmosphere.

2. An indicator as in claim 1 which includes a threaded connection that secures the cap to the connector, the actuator for the pressure sensing valve of the connector having a flat first end that engages the valve element, the actuating member including an end that engages the second end of the actuator as the cap is threaded onto the connector, and one of said interengaged ends being rounded to lessen rotating forces applied to the actuator by the actuating member as the cap is threaded onto the connector.

3. An indicator as in claim 2 wherein the flat first end of the actuator has a larger size than the second end thereof, and the second end of the actuator being the one which is rounded.

4. An indicator as in claim 3 wherein the housing of the connector includes a depression within the valve seat for receiving the enlarged first end of the actuator.

5. An indicator as in claim 3 wherein the valve element of the pressure sensing valve includes a metal disc and a rubber disc secured to each other, the rubber disc facing toward the cap and being engaged with the valve seat and by the first end of the valve actuator, and the metal disc facing toward the tire valve.

6. An indicator as in claim 1 wherein the closure valve includes a bore in the housing of the cap, said valve bore having an outer end including a restricted valve seat and a valve element that is received by the valve bore and which is moved outwardly by air flow through the bore after the cover ruptures so as to be engaged with the seat to close the closure valve.

7. An indicator as in claim 6 wherein the closure valve bore has an inner end of a larger size than the outer end thereof, the valve seat of the closure valve seat being round, and the valve element of the closure valve being a ball made from a deformable material, the ball being initially received within the inner end of the closure valve bore and having a sufficient diameter so as to be moved into an interference condition with the outer end thereof upon engaging the round valve seat so as to be retained in engagement therewith.

8. A tire pressure warning indicator comprising: a connector having a threaded bore that is threaded over a tire valve for use; a cap having a threaded connection to the connector; the cap being threaded onto the connector after the connector is first threaded onto the tire valve; the connector including a housing having a tire valve opener that opens the tire valve upon threading of the connector thereto; the housing also having a passage for communicating the pressurized air from the tire valve to the cap; the passage including a guide portion; a pressure sensing valve disposed along the passage and having a valve seat and a valve element movable into and out of engagement with the valve seat to control the flow of pressurized air to the cap from the tire valve; the valve element being engaged with the seat by pressurized air from the tire valve at normal tire pressures; a valve actuator slidably mounted within the guide portion of the connector housing passage for movement toward and away from the tire valve; the valve actuator having a first enlarged end that engages the valve element of the pressure sensing valve and a second rounded end that extends toward the cap; the cap including a housing that is secured to the housing of the connector upon the cap securement to the connector; an actuating member mounted within the cap housing; a spring that biases the actuating member into engagement with the second rounded end of the valve actuator of the connector; said spring having a bias that unseats the valve element from the seat through the actuating member and the actuator when the air from the tire valve drops below a predetermined normal tire pressure; an elastomeric cover in which the housing of the cap is enclosed; said elastomeric cover being blown up by air which flows thereinto from the pressure sensing valve when the valve element thereof is unseated and the blown up cover ultimately rupturing to provide an alarm that indicates a low tire pressure condition; and a closure valve in the cap housing including a bore with an outer end having a restricted valve seat and a ball received within the bore so as to be moved outwardly by air flow through the bore after the cover ruptures and to thereby engage the restricted valve seat of the bore to close the closure valve.

9. An indicator as in claim 8 wherein cap housing includes a main housing portion and a closure valve housing portion that are threaded to each other to compress the spring.

10. A tire pressure warning indicator comprising: a connector including a housing having a metal housing portion and a plastic housing portion that are threaded to each other to cooperatively define a passage; the metal housing portion including a threaded bore that is threaded onto a tire valve for use; a valve opener along the passage that opens the tire valve to feed pressurized tire air to the passage as the threaded bore is threaded thereon; the plastic housing portion including an actuator guide portion of the passage; a pressure sensing valve disposed along the passage and including a valve seat on the plastic housing portion and a valve element movable into and out of engagement with the valve seat to control the flow of pressurized air to the cap from the tire valve; the valve element including a rubber disc that is engaged with the seat by pressurized air from the tire valve at normal tire pressures and a metal disc secured to the rubber disc and facing the valve opener; a valve actuator slidably mounted by the plastic housing portion within the passage guide portion for movement toward and away from the tire valve; the valve actuator having a first enlarged end that engages the valve element of the pressure sensing valve and a second rounded end that extends away from the tire valve; a cap including a housing that is threaded onto the plastic housing of the connector after the connector is first threaded onto the tire valve; an actuating member mounted within the cap housing; a spring that biases the actuating member into engagement with the second rounded end of the valve actuator of the connector; said spring having a bias that unseats the valve element from the seat through the actuating member and the actuator when the air from the tire valve drops below a predetermined pressure; an elastomeric cover in which the housing of the cap is enclosed; said elastomeric cover being blown up by air which flows thereinto from the pressure sensing valve when the valve element thereof is unseated and the blown up cover ultimately rupturing to provide an alarm that indicates a low tire pressure condition; and a closure valve in the cap housing including a bore with an outer end having a restricted valve seat and a deformable ball received within the bore so as to be moved outwardly by air flow through the bore after the cover ruptures and thereby engage the restricted valve seat of the bore to close the closure valve.

* * * * *